Nov. 19, 1940.     L. H. GARLINGHOUSE     2,221,834
WHEELBARROW
Filed April 27, 1940
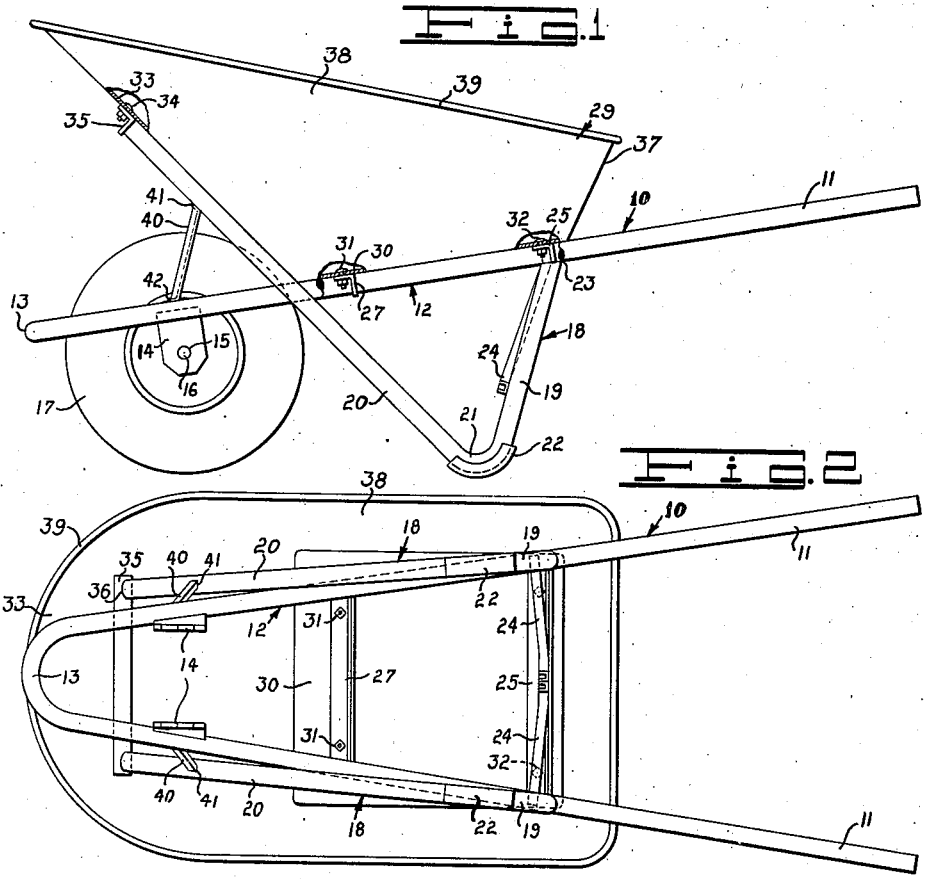
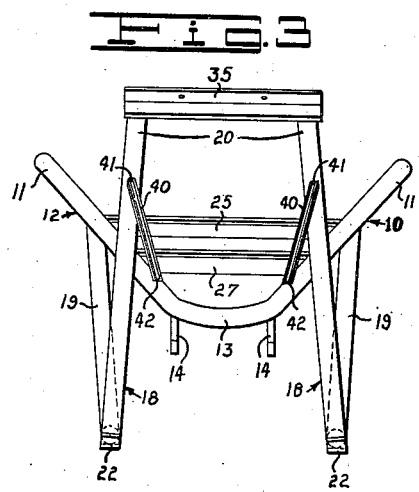
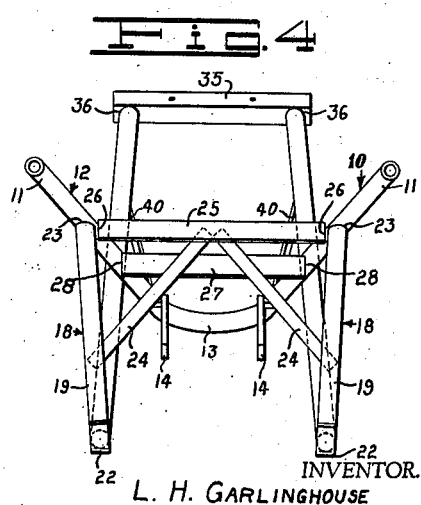
INVENTOR.
L. H. GARLINGHOUSE
BY
ATTORNEY.

Patented Nov. 19, 1940

2,221,834

UNITED STATES PATENT OFFICE 2,221,834

WHEELBARROW

Leslie H. Garlinghouse, Los Angeles, Calif.

Application April 27, 1940, Serial No. 331,983

3 Claims. (Cl. 280—52)

This invention relates to wheelbarrows.

The general object of the invention is to provide a novel wheelbarrow including novel parts which can be economically made and readily assembled.

Another object of the invention is to provide a novel wheelbarrow frame.

A further object of the invention is to provide a wheelbarrow including novel reinforcing means for the parts thereof.

Other objects and the advantages of this invention will be apparent from the following description taken in connection with the accompanying drawing, wherein:

Fig. 1 is a side elevation with parts broken away showing my improved wheelbarrow;

Fig. 2 is a bottom plan view of the wheelbarrow;

Fig. 3 is a front elevation of the wheelbarrow chassis; and

Fig. 4 is a rear elevation of the wheelbarrow chassis.

As shown, the wheelbarrow and chassis includes a generally V-shaped body member indicated generally at 10, including a grip portion 11 at each side with side portions 12 integral therewith, and connected by a curved front portion 13.

The side portions 12 have ears 14 welded thereto which extend downwardly therefrom and which are shown as apertured at 15 to receive the axle 16 of a rubber tired or other supporting wheel 17.

A support and body engaging member indicated generally at 18 is arranged adjacent each of the side portions 12 and includes a substantially vertically extending leg portion 19. The leg portions 19 are secured to a forwardly extending body engaging portion 20 by a curved portion 21 on which a wear plate 22 is secured as by welding.

The members 10 and 18 are preferably made of metal pipe and the upper ends of each leg portion 19 is welded as at 23 to the lower surface of the adjacent side portion 12. Intermediate each leg portion 19 I arrange a brace portion 24. These brace portions are welded at their lower ends to the legs and at their upper ends engage and are welded to a rear cross member 25 which is in turn welded at each end as at 26 to the inside of the side portion 12.

A front cross member 27 welded to the side portion at 28 is also provided and serves to support a body 29. This body includes a bottom 30 shown as secured by bolts 31 and 32 to the cross members 25 and 27. The body also includes an inclined front portion 33 secured by bolts 34 to a cross member 35 welded as at 36 to the ends of the body engaging members 20. The body 29 includes a rear well 37, side wall 38 and includes a rim 39.

The body engaging portions 20 each has the upper end of a brace member 40 welded thereto at 41, while the lower end of each brace member 40 is welded as at 42 to the upper surface of the side portion 12 above the ears 14.

From the foregoing it will be apparent that my improved wheelbarrow can be readily made from standard materials at low cost and that it is highly efficient for its intended purpose.

Having thus described my invention, I claim:

1. In a wheelbarrow, a chassis including a substantially V-shaped chassis member including side portions with grip portions on one end thereof, an intermediate connecting curve connecting the side portions, a depending ear on each side portion, each of said ears having a hole therein spaced downwardly from said V-shaped chassis, an axle disposed in said holes, a wheel on said axle, said chassis including spaced body engaging members, each member including a leg portion and a body engaging portion connected by a curved portion, a wear plate on said last mentioned curved portion, the upper end of each of said leg portions being welded to said side portions and the body engaging portions being disposed outside of said side portions, a rear cross member connecting said side portions, brace members engaging said rear cross member and connected to said leg portions, a front cross member connecting said side portions, a cross member connecting said body engaging portions at their outer end, a brace connecting said body engaging portions and said side portions, said last mentioned brace member being disposed substantially above said axle, a body disposed on said chassis, said body having a bottom engaging said side portions and having an inclined front portion engaging said body engaging members, said body including a rear portion and side portions and removable fastening means engaging said body and said cross members.

2. In a wheelbarrow, a chassis including a substantially V-shaped body member including side portions and an integral intermediate connecting curved end portion, an axle mounted on said side portions, a wheel on said axle, said chassis including a body engaging member, said body engaging member including integral leg portions and body engaging portions connected by curved portions, said leg portions being secured to said side portions, a rear cross member connecting said side portions, a front cross member connecting said side portions, a cross member connecting said body engaging portions at their forward ends, and a body disposed on said chassis, said body including a bottom engaging said side portions and an inclined front portion engaging said body engaging members, and means to hold said body in place.

3. In a wheelbarrow, a chassis including a substantially V-shaped chassis member including side portions with grip portions on one end thereof, an intermediate connecting curve connecting the side portions, a depending ear secured on each side portion, each of said ears having a hole therein spaced downwardly from said V-shaped chassis, an axle disposed in said holes, a wheel on said axle, said chassis including spaced body engaging members, each member including a leg portion and a body engaging portion connected by a curved portion, a wear plate welded on said curved portion, the upper end of each of said leg portions being secured to said side portions and the body engaging portions being disposed outside of said side portions, a rear cross member secured to said side portions, brace members secured to said rear cross member and to said leg portions, a front cross member secured to said side portions, a cross member secured to said body engaging portions at their outer end, a brace member secured to said body engaging portions and said side portions, said last mentioned brace members being disposed substantially above said axle, a body disposed on said chassis, said body having a bottom engaging said side portions and having an inclined front portion engaging said body engaging members, said inclined front portion extending forward to a position in front of said wheel, said body including a rear portion and side portions and removable fastening means engaging said body and said cross members.

LESLIE H. GARLINGHOUSE.